US008825773B1

(12) United States Patent
Gauvin

(10) Patent No.: US 8,825,773 B1
(45) Date of Patent: Sep. 2, 2014

(54) SYSTEMS AND METHODS FOR CONCEALING INFORMATION RELATING TO A PROFILE PROVIDED BY A SOCIAL NETWORKING SERVICE

(75) Inventor: William J. Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 803 days.

(21) Appl. No.: 12/886,359

(22) Filed: Sep. 20, 2010

(51) Int. Cl.
*G06F 15/16* (2006.01)
*H04L 12/58* (2006.01)

(52) U.S. Cl.
CPC .............. *H04L 51/046* (2013.01); *H04L 51/04* (2013.01); *H04L 51/12* (2013.01); *H04L 51/14* (2013.01)
USPC ........................... 709/206; 709/207; 709/229

(58) Field of Classification Search
CPC ....... H04L 51/00; H04L 51/04; H04L 51/046; H04L 51/12; H04L 51/14; H04L 51/32
USPC .......................................... 709/206, 207, 229
See application file for complete search history.

(56) References Cited

U.S. PATENT DOCUMENTS

| | | | |
|---|---|---|---|
| 7,844,671 B1* | 11/2010 | Lawler et al. ................. | 709/206 |
| 7,925,743 B2* | 4/2011 | Neely et al. ................... | 709/224 |
| 7,930,252 B2* | 4/2011 | Bender et al. ................. | 709/228 |
| 2008/0114737 A1* | 5/2008 | Neely et al. ................... | 709/202 |
| 2009/0254358 A1* | 10/2009 | Li et al. .......................... | 715/757 |
| 2010/0070875 A1* | 3/2010 | Turski et al. .................. | 715/748 |
| 2010/0262550 A1* | 10/2010 | Burritt et al. ..................... | 726/27 |
| 2011/0047229 A1* | 2/2011 | Sinha et al. .................... | 709/206 |
| 2012/0023332 A1* | 1/2012 | Gorodyansky ............... | 709/204 |
| 2012/0036205 A1* | 2/2012 | Cole ............................ | 709/206 |

\* cited by examiner

*Primary Examiner* — Patrice Winder
(74) *Attorney, Agent, or Firm* — Holland & Hart LLP

(57) ABSTRACT

A computer-implemented method for concealing information of a personal profile provided by a social networking service is described. A message sent from the personal profile to a second profile provided by the social networking service is monitored. A determination is made as to whether the second profile is a commercial profile. The message is received when the second profile is a commercial profile. An avatar profile is used to publish the message anonymously to the second profile on behalf of the personal profile. A message sent from the second profile to the personal profile is intercepted when the second profile is a commercial profile. The intercepted message is analyzed with respect to at least one security filter. The message is associated with the avatar profile when the message passes the at least one security filter. The avatar profile is used to publish the message to the personal profile.

20 Claims, 9 Drawing Sheets

SYSTEMS AND METHODS FOR CONCEALING INFORMATION RELATING TO A PROFILE PROVIDED BY A SOCIAL NETWORKING SERVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Computing systems may provide social networking services. These services may be accessed via the Internet. Social networking services may allow users with similar interests, hobbies, careers, etc. to connect and share information. In addition, social networking services may allow companies and other entities to connect with existing customers, potential customers, etc. Companies and the other entities may provide information regarding new products or services to connected users via the social networking services. Users may also provide information to companies and these other entities via the social networking services. The act of sharing information, however, with companies and these other entities via social networking services may eliminate a certain level of anonymity and privacy for users. As a result, benefits may be realized by providing systems and methods for concealing information relating to a profile provided by a social networking service.

SUMMARY

According to at least one embodiment, a computer-implemented method for concealing information relating to a personal profile provided by a social networking service is described. A message sent from the personal profile to a second profile provided by the social networking service is monitored. A determination is made as to whether the second profile is a commercial profile provided by the social networking service. The message is received when the second profile is a commercial profile. An avatar profile created by an avatar proxy service is used to publish the message to the second profile on behalf of the personal profile.

In one embodiment, a message sent from the second profile to the personal profile is intercepted when the second profile is a commercial profile. The intercepted message may be analyzed with respect to at least one security filter. In one example, the intercepted message may be associated with the avatar profile when the message passes the at least one security filter. The avatar profile may be used to publish the message to the personal profile. In one embodiment, the published message may include an avatar profile identifier and a second profile identifier. In another embodiment, the message may be discarded when the message does not pass the at least one security filter.

In one example, the avatar profile may emulate characteristics of a profile provided by the social networking service. The avatar proxy service that provides the avatar profile may be implemented in cloud storage.

A computing device configured to conceal information relating to a personal profile provided by a social networking service is also described. The computing device includes a processor and memory in electronic communication with the processor. The computing device also includes an avatar proxy service configured to monitor a message sent from the personal profile to a second profile provided by the social networking service, and determine whether the second profile is a commercial profile provided by the social networking service. The avatar proxy service is further configured to receive the message when the second profile is a commercial profile, and use an avatar profile to publish the message to the second profile on behalf of the personal profile.

A computer-program product for concealing information relating to a personal profile provided by a social networking service is also described. The computer-program product including a computer-readable medium having instructions thereon. The instructions including code programmed to monitor a message sent from the personal profile to a second profile provided by the social networking service, and code programmed to determine whether the second profile is a commercial profile provided by the social networking service. The instructions further including code programmed to receive the message when the second profile is a commercial profile, and code programmed to use an avatar profile to publish the data to the second profile on behalf of the personal profile.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 2 is a block diagram illustrating one embodiment of a social networking browser plug-in;

Figure 1:
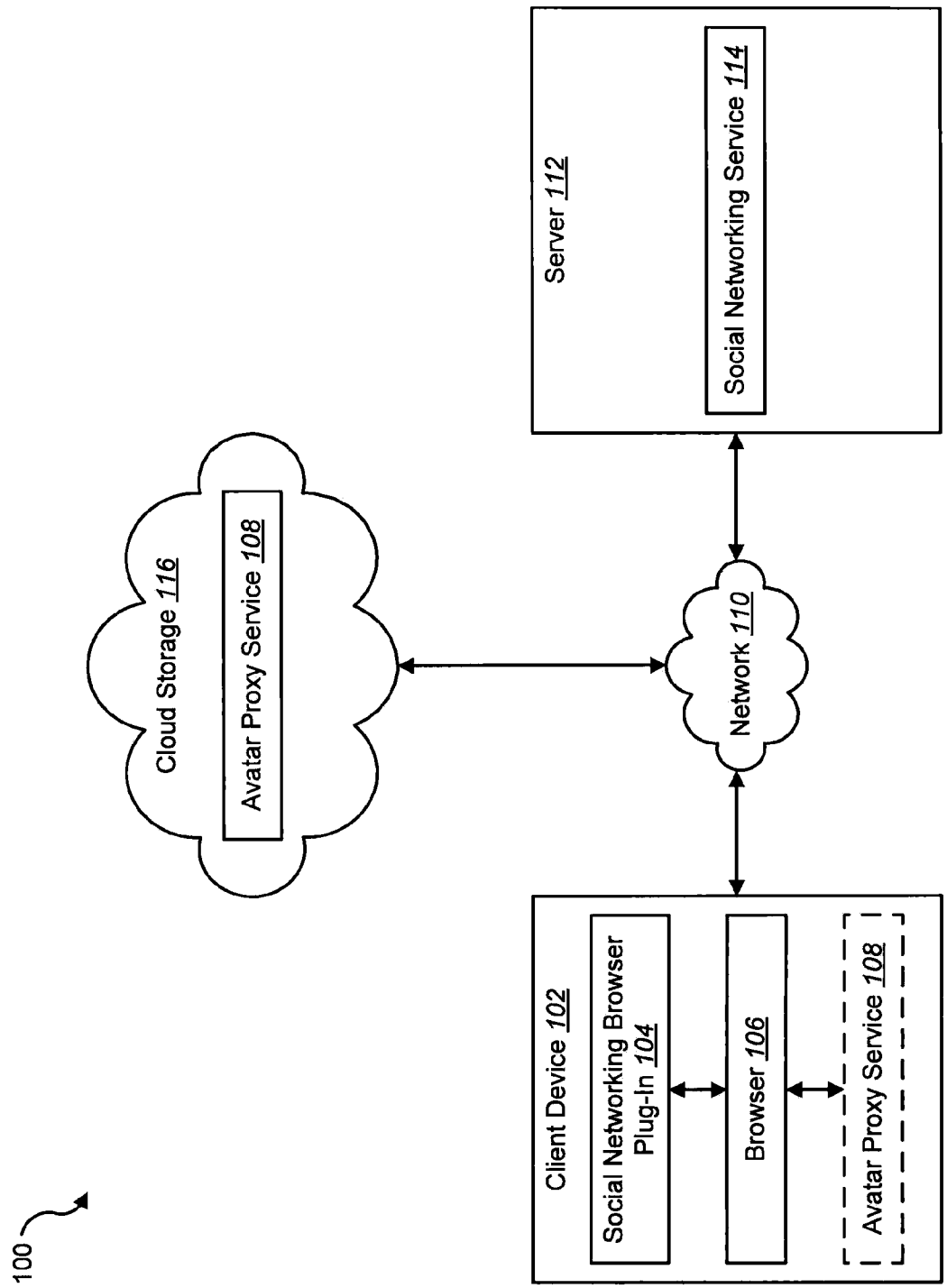
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Social networking has rapidly become one of the most popular means of communicating in recent years. A social network service may be an online service (such as a website) that focuses on building and reflecting social networks or social relations among people, entities, etc. A social network service may include a representation of each user (often referred to as a "profile"), the user's social links, and a variety of additional services. Many social network services may be web based and may provide means for users to interact over the Internet, such as email and instant messaging. Some social networking websites have additional features, such as the ability to create social groups that group together individuals that share common interests or affiliations. Members of a social group may use the social networking websites to upload or stream live videos, hold discussions in forums with other members of the social group, and the like.

One use of social network technology is social networking between businesses and other entities. These entities may use social networking websites to build their brand image. In one example, companies may use social networking sites as an online reputation management tool, for recruiting, to learn about new technologies and competitors, and as a lead generation tool to intercept potential customers. Other entities (athletic team, school, band, etc.) may use social networking websites to send information about upcoming events and other information to individuals. Companies and these other entities may use their social networking websites to drive traffic to their own websites. In addition, companies and these other entities may use their social networking websites to encourage their consumers, clients, followers, etc. to have discussions on how to improve or change products or services offered by the companies and other entities. As a result, a social networking service may include personal websites (i.e., social networking websites associated with individuals) and commercial websites (i.e., social networking websites associated with a company or other non-human entity).

The interaction between a user and a commercial social networking website may be viewable to the public. For example, a user may upload a comment to a commercial social networking website that expresses the user's interest in a certain product or service. This comment may be viewable by other users that also view the commercial social networking website. This may allow solicitors to view comments posted by the user to the commercial website, extract contact information from the comment posted by the user, and contact the user using the extracted contact information. Solicitors may contact the user with information intended to exploit and deceive the user. The privacy lost by this activity is unwarranted, since, in many of these situations an individual simply desires voyeur capability to check a commercial website for up-and-coming events offered by a particular entity, or the individual may indiscriminately desire to comment about a performance or product within a social group of other users that is not tightly associated or connected.

In one embodiment, the present systems and methods may implement a virtual avatar to communicate with a commercial social networking website. The virtual avatar may include personal capabilities as well as commercial capabilities. The personal capabilities may be used for communications from a personal social networking website (i.e., a personal profile) to a commercial social networking website (i.e., a commercial profile). The commercial capabilities may be used for communications from a commercial profile to a personal profile.

In one example, when an individual "friends" a particular profile represented as a website of a social networking service, a classifier may be used to determine whether the profile is commercial or personal. If the profile is commercial, the virtual avatar (e.g., an avatar profile) may be used to represent the individual. Any information from the individual that is intended to be posted to the commercial profile may be automatically redirected to the virtual avatar. The virtual avatar may then use the personal capabilities to post the information on the commercial profile on behalf of the individual. The virtual avatar may emulate the individual by presenting a valid avatar profile represented as a personal social networking website. The virtual avatar may also replicate communication resources found on social networking websites, such as email and instant messaging mechanisms.

In one configuration, responses and solicitations originating from the commercial profile to the communication resources provided by the virtual avatar may be validated and scanned in order to protect the individual. If the information is validated and desired by the individual, the commercial capabilities of the virtual avatar may be used to post information originating from the commercial profile to the individual's personal profile. In one embodiment, spam prevention and other security methods may be used to validate the information originating from the commercial profile.

The commercial capabilities of the virtual avatar may mirror the personal capabilities of the virtual avatar such that posts to the individual's personal profile "appear" as though they came from the commercial profile, when in fact the posts were replicated from the virtual avatar. The replication may be implemented by using a commercial profile image and link.

In one embodiment, the implementation of the present systems and methods may require an online social networking intercept on a client device used by an individual, a commercial classifier, which may include white and black lists, and an online social networking proxy which may redirect user posts based on the classification of the target profile.

The virtual avatar of the present systems and methods may be implemented in at least two ways. First, a client based approach may be used. Second, a cloud service approach may be used. The personal capabilities of the virtual avatar may use a posting service to transform personal profiles to virtual avatars and publish information to commercial profiles. The commercial capabilities of the virtual avatar may use spam and security detection services to facilitate the propagation of commercial posts to personal profiles (if desired by the owners of the personal profiles). An avatar policy may be set to provide complete voyeurism, or may allow a commercial profile to interact directly with a personal profile for specific events, services, products, etc., but not necessarily all correspondence.

FIG. 1 is a block diagram 100 illustrating one embodiment of an environment in which the present systems and methods may be implemented. In one example, a client device 102 may communicate with a server 112 across a network connection 110. The client device 102 may be a personal computer (PC), a laptop, a smart phone, a personal digital assistant (PDA), or any other type of computing device.

In one configuration, the client device 102 may include a browser 106. The browser 106 may be used to access and display websites to a user of the client device 102. In one example, the browser 106 may access websites provided by a social networking service 114 that is hosted on the server 112. Examples of social networking services may include Facebook®, MySpace®, Flickr®, LinkedIn®, Xanga®, and the like. In one configuration, a social networking browser plug-in 104 may interface with the browser 106. The plug-in 104 may provide additional functionalities and capabilities to the browser 106, as will be described below.

In one embodiment, a cloud storage 116 may include an avatar proxy service 108. The client device 102 and the server 112 may communicate with the avatar proxy service 108 via the network connection 110. The avatar proxy service 108 may emulate certain characteristics of websites provided by the social networking service 114. In one embodiment, the avatar proxy service 108 may intercept messages originating from a particular type of social networking website displayed on the client device 102. The avatar proxy service 108 may modify or otherwise analyze the intercepted messages and transmit these messages to another type of social networking website or service. For example, the message may be transmitted to another service to be scanned and validated. In one embodiment, the service may not be internal to the social networking service 114, but may be a separate and distinct networking service. In one configuration, the avatar proxy service 108 may be installed on the client device 102 instead of the cloud storage 116.

Figure 2:
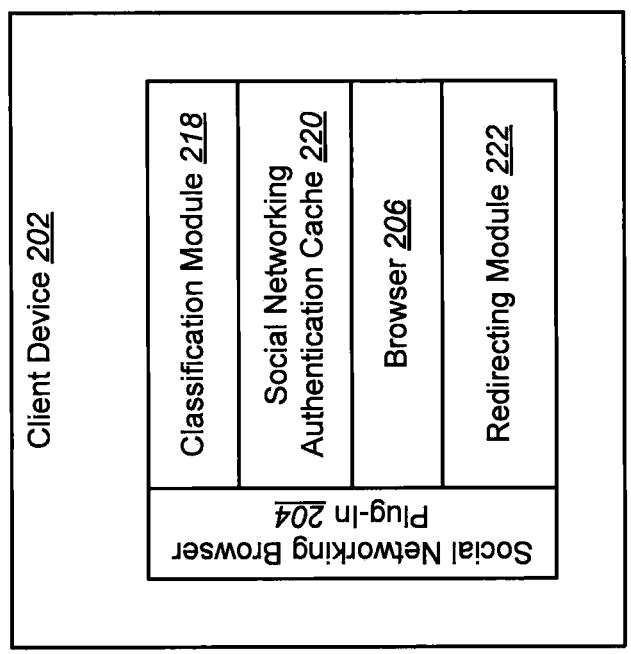

FIG. 2 is a block diagram illustrating one embodiment of a social networking browser plug-in 204. A client device 202 may include the social networking browser plug-in 204 which may interface with a browser 206, such as a web browser. The plug-in 204 may provide additional functionalities and capabilities to the browser 206. For example, the plug-in 204 may provide a classification module 218, social networking authentication cache 220, and a redirecting module 222.

In one embodiment, the browser 206 may access and display a particular website to a user of the client device 202. The website may be provided by the social networking service 114. A social networking website may allow the user to create a personal profile. The profile may include the user's name, contact information, interests, hobbies, and the like. The user may also upload pictures, videos, and other multi-media files to the personal profile.

The social networking website provided by the social networking service 114 may also allow a company or other entity to create a profile (i.e., a commercial profile). A commercial profile may include the entity's name, contact information, information about products or services offered by the entity, and the like. The entity may also upload pictures, videos, and other multi-media files to the commercial profile.

In one embodiment, the avatar proxy service 108 may also create an avatar profile for the social networking website. The avatar profile may be an anonymous profile that is only associated with the avatar proxy service 108 (i.e., the avatar profile may not be associated with a particular user, company, entity, and the like). The avatar profile may emulate certain characteristics of personal profiles associated with the website provided by the social networking service 114. For example, the avatar profile may be similar in appearance and functionality to other personal profiles on the website.

In one embodiment, the classification module 218 may analyze a website provided by the browser 206. In one example, the website may be a social networking profile. The classification module 218 may classify the profile as either a personal profile or a commercial profile. The social networking authentication cache 220 may include credentials and other information that enables a connection or handshake between the browser 206 and websites provided by the social networking service 114. The cache 220 may allow the browser 206 to continuously access one or more websites provided by the networking service 114 without requiring a user of the client device 202 to provide credentials (e.g., username and password) each time the user desires to access websites provided by the social networking service 114. In one configuration, the redirecting module 222 may redirect messages generated by a personal profile to the avatar proxy service 108.

Figure 3:
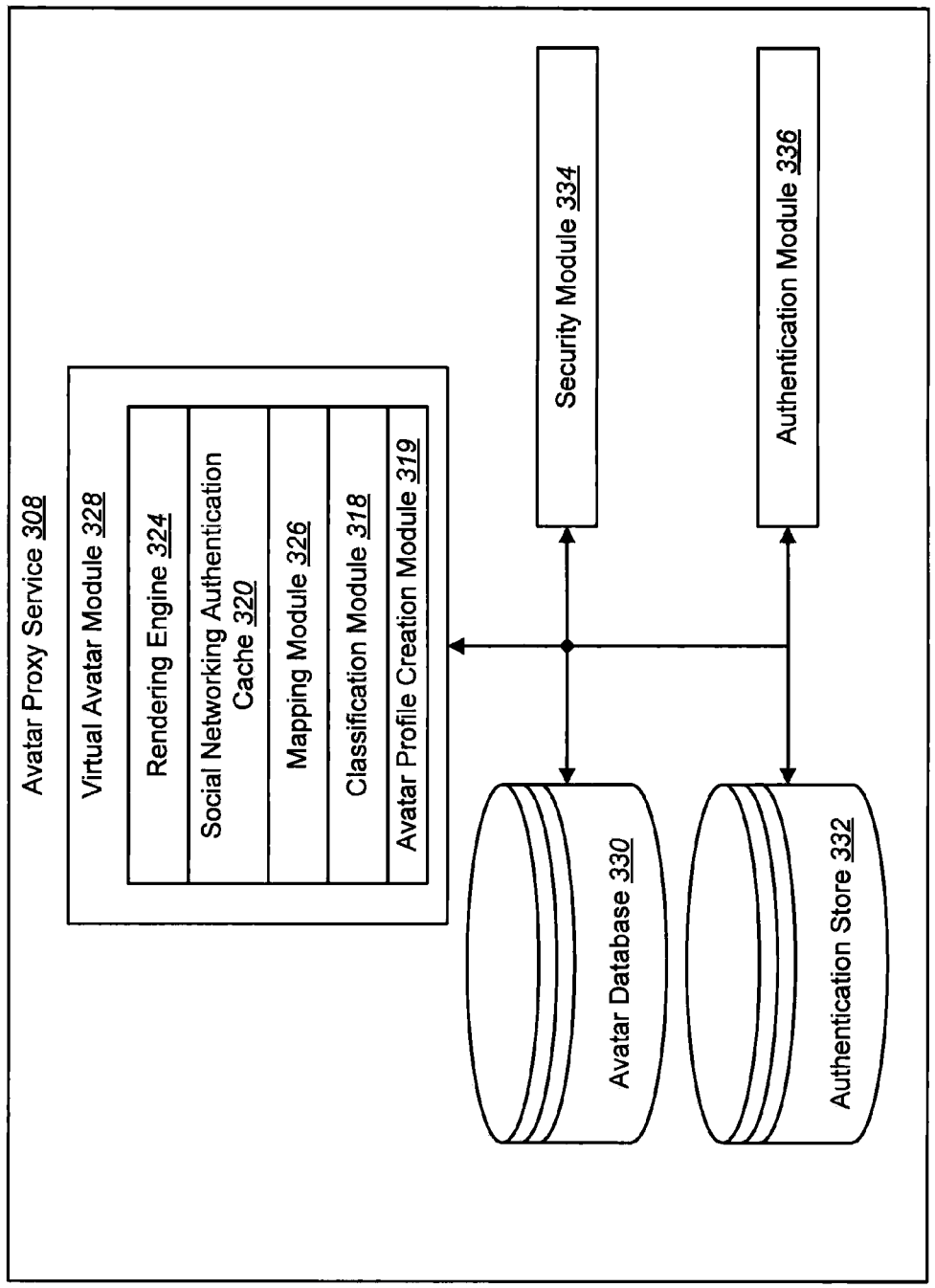
FIG. 3 is a block diagram illustrating one embodiment of an avatar proxy service.

FIG. 3 is a block diagram illustrating one embodiment of an avatar proxy service 308. As previously explained, the modules and various components of the avatar proxy service 308 may be included in cloud storage 116 or installed and implemented on the client device 102.

In one embodiment, the avatar proxy service 308 may include a virtual avatar module 328. The module 328 may include a rendering engine 324, social networking authentication cache 320, a mapping module 326, and a classification module 318. The avatar proxy service 308 may also include an avatar database 330, an authentication store 332, a security module 334, and an authentication module 336. Details regarding each of these modules and components will be described below.

In one embodiment the avatar proxy service 308 may provide the ability to intercept requests from a personal profile to post information (e.g., message, query, comment, etc.) to a commercial profile. After intercepting the request to post information, the proxy service 308 may post the information to the commercial profile using the virtual avatar module 328. The virtual avatar module 328 may include an avatar profile creation module 319 that creates an avatar profile that emulates a profile (e.g., personal profile and/or commercial profile) provided by the social networking service 114.

In one configuration, information posted to a commercial profile may be public and viewable by other users (such as solicitors) of the social networking service 114. Solicitors may view postings to a commercial profile and extract information about the personal profile that originated a particular posting. A solicitor may then respond to a post on the commercial profile by posting unsolicited information (e.g., message, video, image, etc.) to the personal profile that posted the information to the commercial profile. The use of the virtual avatar module 328 to post information to a commercial profile may provide anonymity for the user associated with the personal profile. As a result, solicitors may be unable to post unsolicited information to the originating personal profile because the virtual avatar module 328 uses the avatar profile to post the information to the commercial profile on behalf of the originating personal profile. In other words, a solicitor may be unable to identify the actual personal profile that originated the posting to the commercial profile. From the perspective of the solicitor, the avatar profile created by the virtual avatar module 328 is the profile that originated the posting to the commercial profile.

Responses to posts on a commercial profile may also be directed to the avatar proxy service 308. In one embodiment, the security module 334 may scan the response for security violations. In another embodiment, the security module 334 may use an external scanner to scan the response for security violations. The response may be posted to the personal profile that originated the post to the commercial profile if filtering criteria are met as determined by the security module 334. Filtering criteria and security criteria may be stored in the avatar database 330. The database 330 may store criteria for various users. For example, a first user may desire to receive information from a commercial profile if that information includes a description of an upcoming product or service. A second user may desire to receive information from a commercial profile if that information includes multi-media files (e.g., images, videos, etc.). The database 330 may store these different criteria requirements for the different users of the avatar proxy service 308.

In one embodiment, the classification module 318 may ascertain whether a targeted profile is either commercial or personal. The avatar database 330 may store previous results. In one example, the client device 102 may query the proxy service 308 to enumerate previous profile decisions or add to the list maintained by the proxy service 308. The cache may be automatically updated in the database 330 by the proxy service 308 when requests to publish information to a commercial profile are received.

The virtual avatar module 328 may include a mapping module 326 to provide a means to multiplex individual personal profiles to specific personal profiles in order to allow reposting of content if the content is validated by the security module 334. The mapping may be one-to-one or many-to-one with respect to the client avatar relationship. The posting of content on commercial profiles may use a specific avatar identification, as well as an opaque identifier, which may be cross referenced by the mapping module 326 to ascertain specific personal profile identities used in reposting (i.e., responding to posts published to a commercial profile).

In one embodiment, the rendering engine 324 may render content of a commercial profile by merging the content of the commercial profile with a replacement of one or more specific published messages originating from a personal profile, but published on behalf of the personal profile by the virtual avatar module 328. The rendering may allow the user associated with the personal profile that originated the message to ascertain which messages on the commercial profile the user is specifically responsible for. When a commercial profile publishes a post to a personal profile via the avatar profile created by the virtual avatar module 328, the profile may post the content, to include any text, images, and objects, which may have passed security filters as decided by the security module 334. These may become permanent contexts on the personal profile and appear as a sub-blog within a blog. This allows the commercial posted content to maintain its structure. This also allows the proxy service 308 to easily render commercial publishings.

As previously described, the avatar proxy service 308 may also include a centralized means to apply security filters, such as anti-virus, anti-malware, anti-spam, and data loss protection. These filters may be implemented by the security module 334. Postings directed to a personal profile may be recorded within a profile blog of a virtual avatar. The virtual avatar module 328 may use the security filters to determine if the post is malicious. If so, the posting may be ignored and not propagated to the personal profile. If a posting passes the security checks, it may be reposted to the personal profile using a combination of the avatar profile identity and the commercial profile identity.

The avatar proxy module 328 may also include social networking authentication cache 320 which may include credentials and other information to enable a handshake or other connection between the avatar proxy service 308 and the client device 102. An authentication store 332 may store the credentials and an authentication module 336 may determine whether certain criteria are met to enable the handshake between the avatar proxy service 308 and the client device 102.

Figure 4:
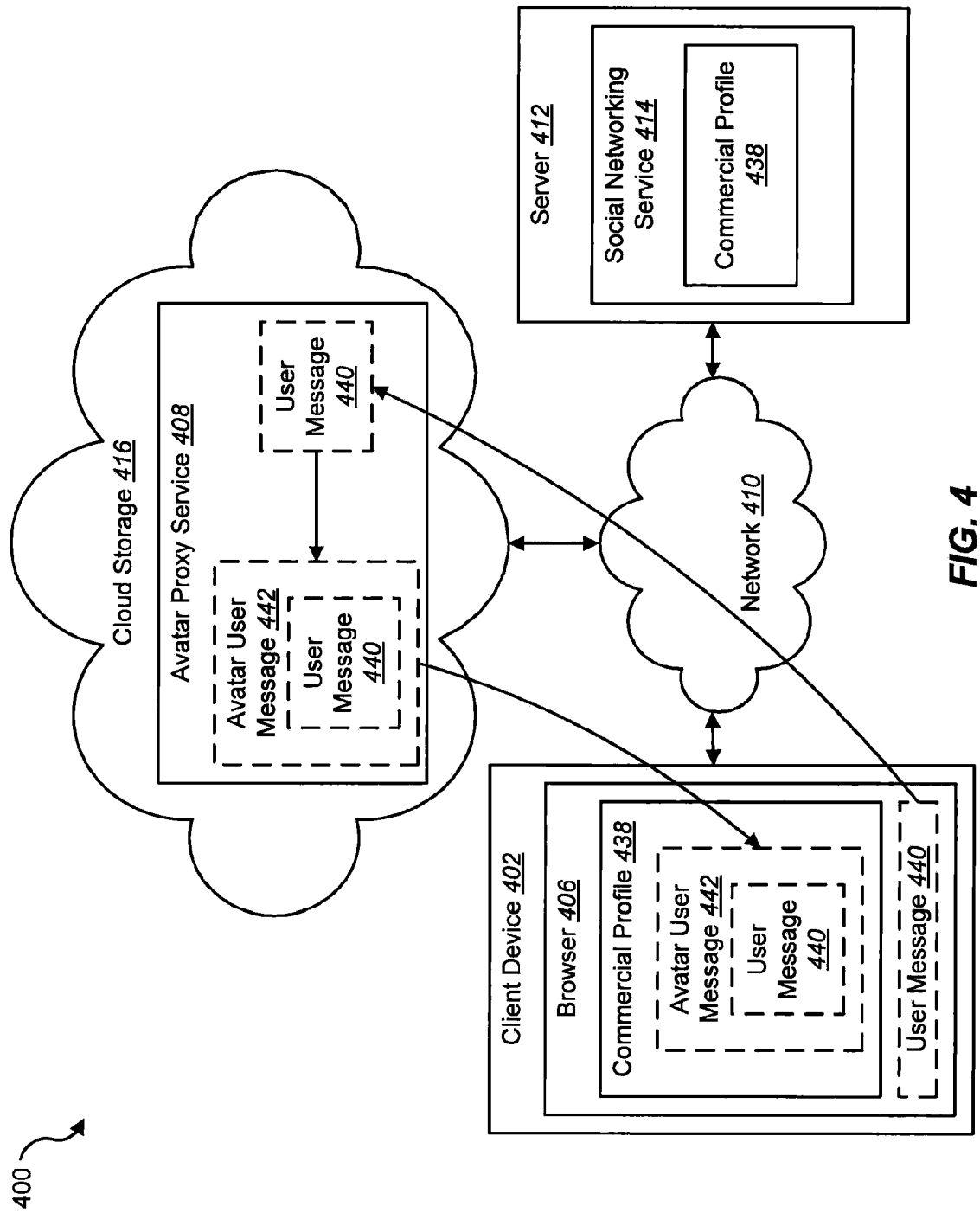
FIG. 4 is a block diagram illustrating one embodiment of an environment in which a message is sent from a personal profile to a commercial profile via the avatar proxy service.

FIG. 4 is a block diagram illustrating one embodiment of a message being sent from a personal profile to a commercial profile via the avatar proxy service 408. In one configuration, a browser 406 on a client device 402 may display a commercial profile 438 to a user. The commercial profile may be represented by a commercial social networking website provided by a social networking service 414.

The user may generate a user message 440 to post to a profile. In one configuration, the user message 440 may be redirected to the avatar proxy service 408. If the targeted profile is a personal profile, the avatar proxy service 408 may propagate the user message 440 to the target personal profile in a transparent manner. If, however, the targeted profile is a commercial profile 438, the user message 440 may be incorporated in an avatar user message 442. The avatar user message 442 may shield, mask, or otherwise conceal information that identifies the personal profile that originated the user message 440 to other users that may view messages posted to the commercial profile 438. The avatar user message 442 that incorporates the user message 400 may then be posted to the commercial profile 438 by the avatar profile created by the avatar proxy service 408. As a result, viewers of the commercial profile 438 may be unable to identify the personal profile that originated the user message 440. Instead, the viewers conclude that the anonymous avatar profile originated the user message 440. The user of the personal profile that truly originated the user message 440, however, may be able to identify the avatar user message 442 that incorporated the user message 440. As a result, the user is able to track messages on the commercial profile 438 that he or she created.

Figure 5:
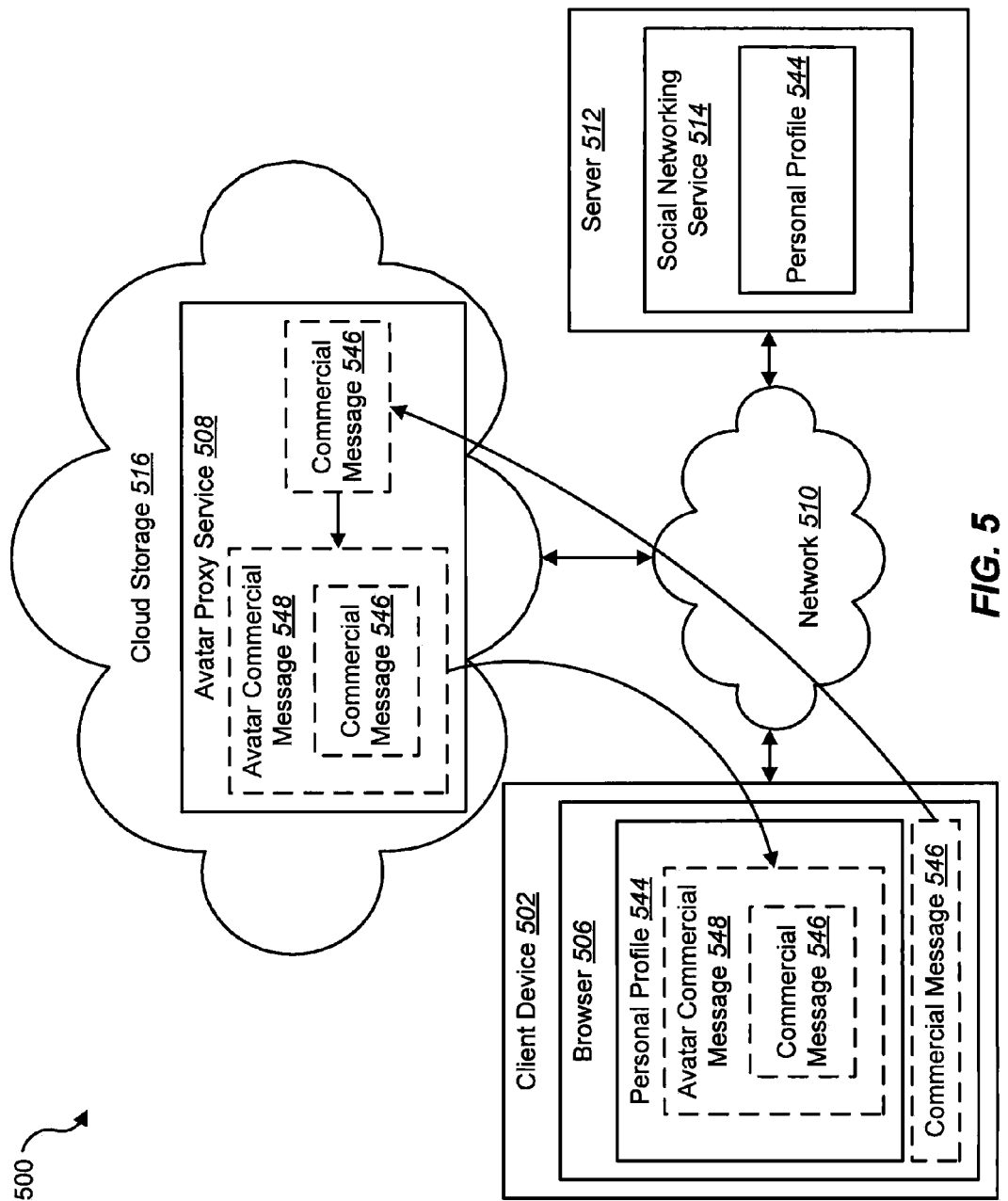
FIG. 5 is a block diagram illustrating one embodiment of an environment in which a commercial message is posted to a personal profile via an avatar proxy service.

FIG. 5 is a block diagram illustrating one embodiment of a commercial message being posted to a personal profile 544 via an avatar profile created by an avatar proxy service 508. In one embodiment, a commercial profile associated with the social networking service 514 may generate a commercial message 546 to post to the personal profile 544. The message 546 may be intercepted and evaluated by the avatar proxy service 508 to determine if the commercial message 546 is spam, a virus, or some other type of undesirable message. If the commercial message 546 is validated by the avatar proxy service 508 as being a desirable message, the commercial message 546 may be incorporated with an avatar commercial message 548. The avatar commercial message 548 may then be posted to the personal profile 544 by the avatar profile created by the avatar proxy service 508. In one embodiment, the incorporation of the commercial message 546 with the avatar commercial message 548 does not shield, mask, or otherwise conceal the commercial profile that originated the commercial message 546. As a result, the user of the personal profile 544 may be able to recognize the commercial profile that created the commercial message 546.

If the commercial message 546 is not validated, the commercial message 546 may not be incorporated with an avatar commercial message 548 and may not be posted to the personal profile 544. In one embodiment, the personal profile 544 may be provided by the social networking service 514 that may be hosted by a server 512.

Figure 6:
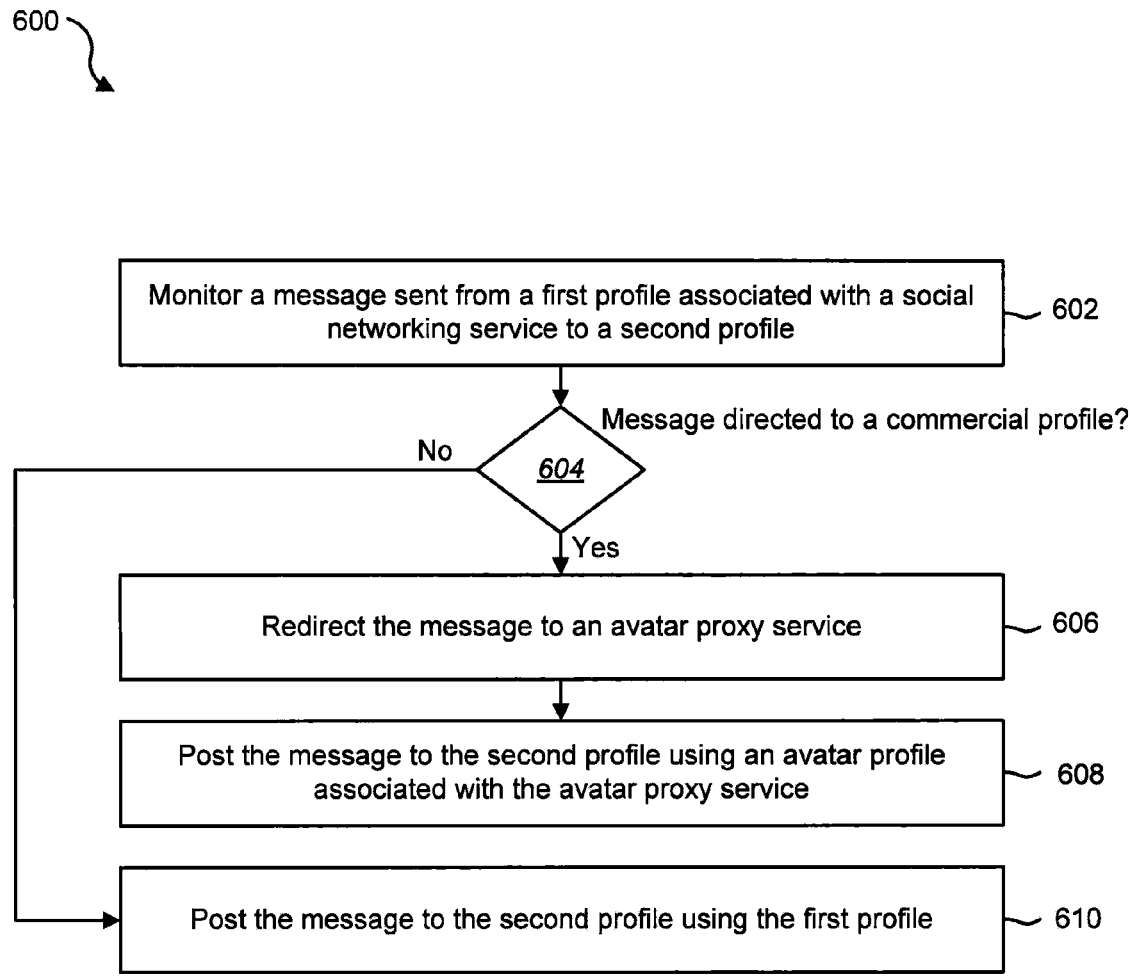
FIG. 6 is a flow diagram illustrating one embodiment of a method for concealing information for a personal profile on a commercial profile via a virtual avatar.

FIG. 6 is a flow diagram illustrating one embodiment of a method 600 for concealing information for a personal profile on a commercial profile via a virtual avatar. In one embodiment the method 600 may be implemented by the avatar proxy service 108.

In one embodiment, a message sent from a first profile associated with a social networking service to a second profile may be monitored 602. In one embodiment, the first profile may be a personal profile. A determination 604 may be made as to whether the message is directed to a commercial profile. If it is determined 604 that the message is not directed to a commercial profile, the first profile may post 610 the message to the second profile. If, however, it is determined 604 that the message is directed to a commercial profile, the message may be redirected 606 to an avatar proxy service. An avatar profile associated with the avatar proxy service may be used to post 608 the message to the second profile.

Figure 7:
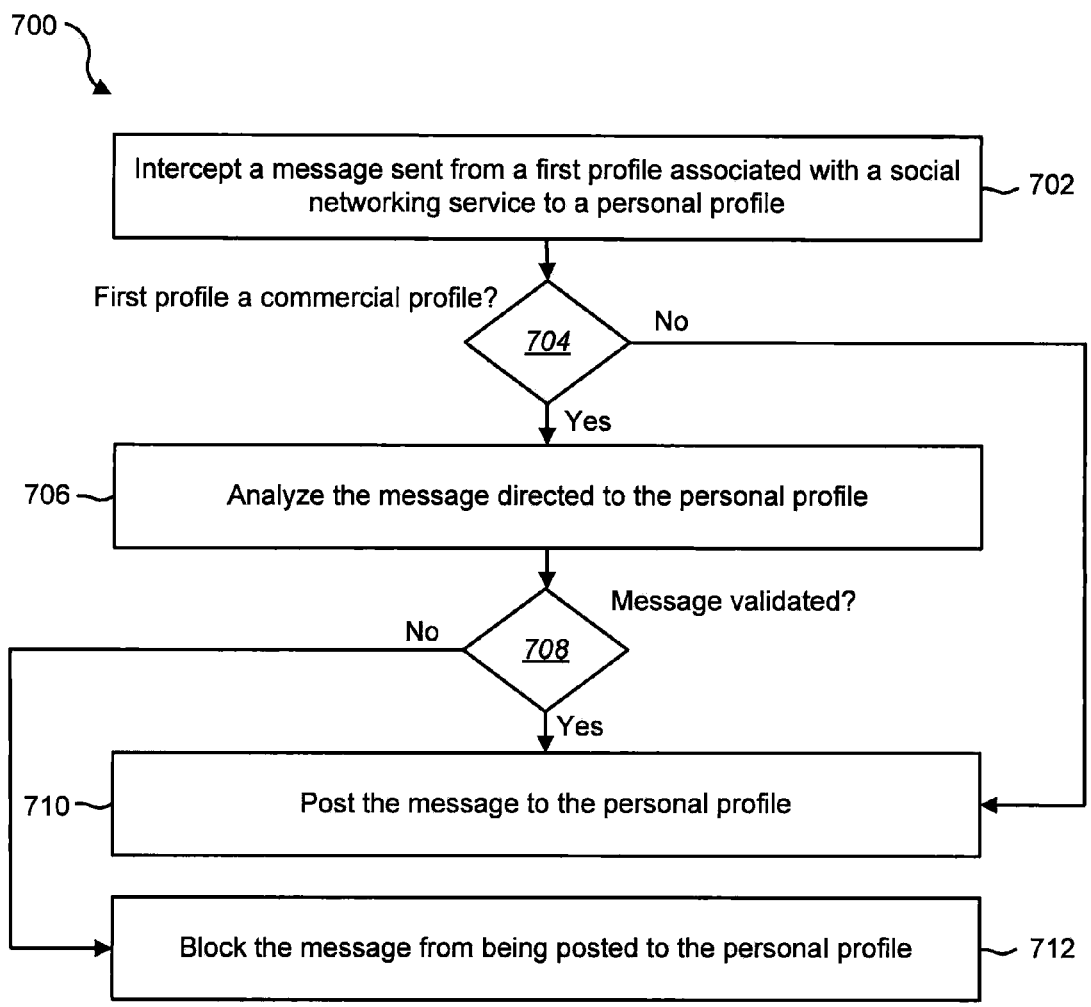
FIG. 7 is a flow diagram illustrating one embodiment of a method for providing a message from a commercial profile to a personal profile via a virtual avatar.

FIG. 7 is a flow diagram illustrating one embodiment of a method 700 for providing a message from a commercial profile to a personal profile via a virtual avatar. The message 700 may be implemented by the avatar proxy service 108.

In one embodiment, a message sent from a first profile associated with a social networking service to a personal profile may be intercepted 702. A determination 704 may be made as to whether the first profile sending the message is a commercial profile. If it is determined 704 that the first profile is not a commercial profile, the message may be posted to the personal profile. If, however, it is determined 704 that the first profile sending the message is a commercial profile, the message may be analyzed 706. A determination 708 may then be made as to whether the message is validated. If it is determined 708 that the message is not validated, the message may be blocked 712 from being posted to the personal profile. If, however, it is determined 708 that the message is validated, the message may be posted 710 to the personal profile via an avatar profile created by the avatar proxy service 108.

Figure 8:
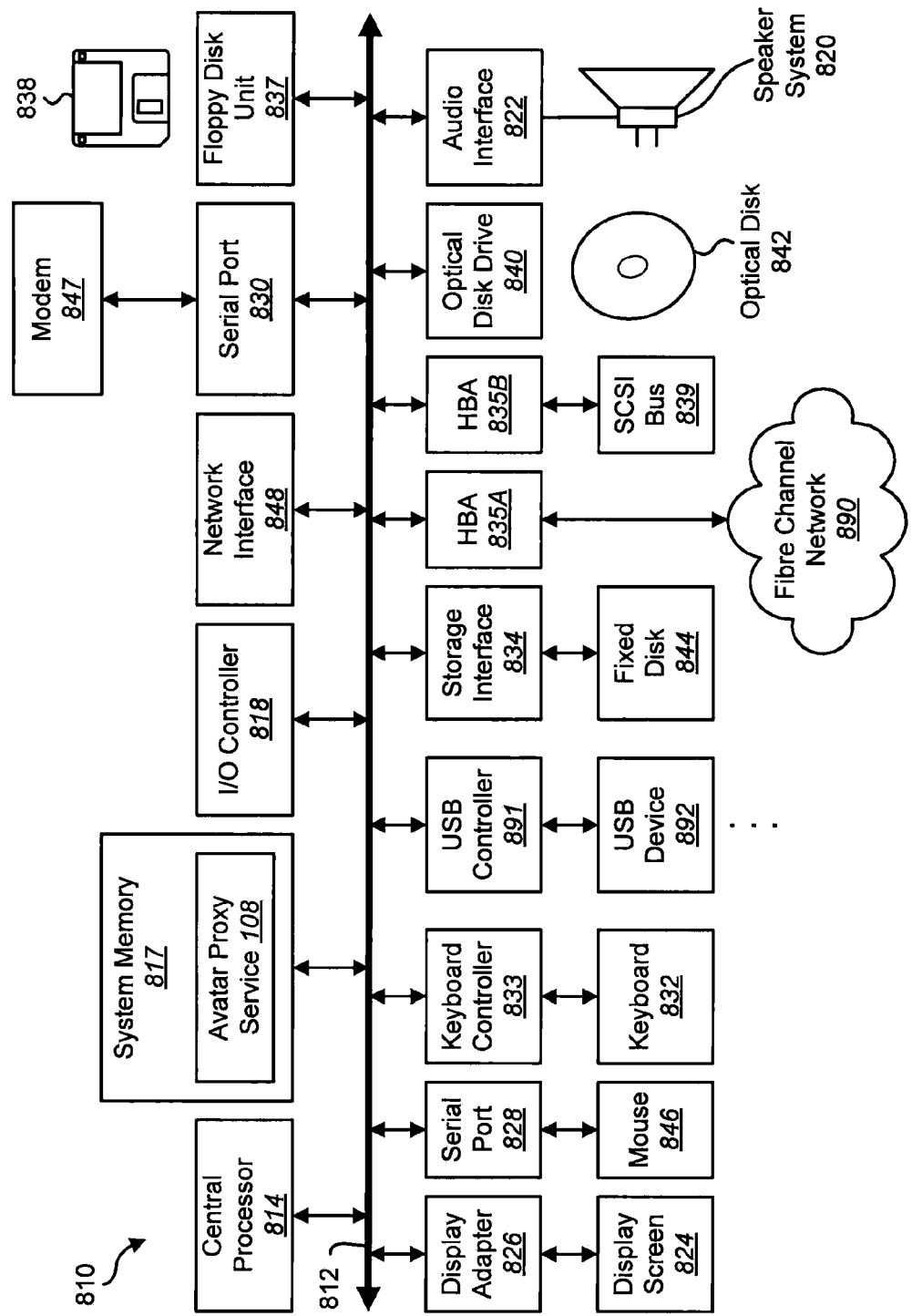
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 890), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the avatar proxy service 108 to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
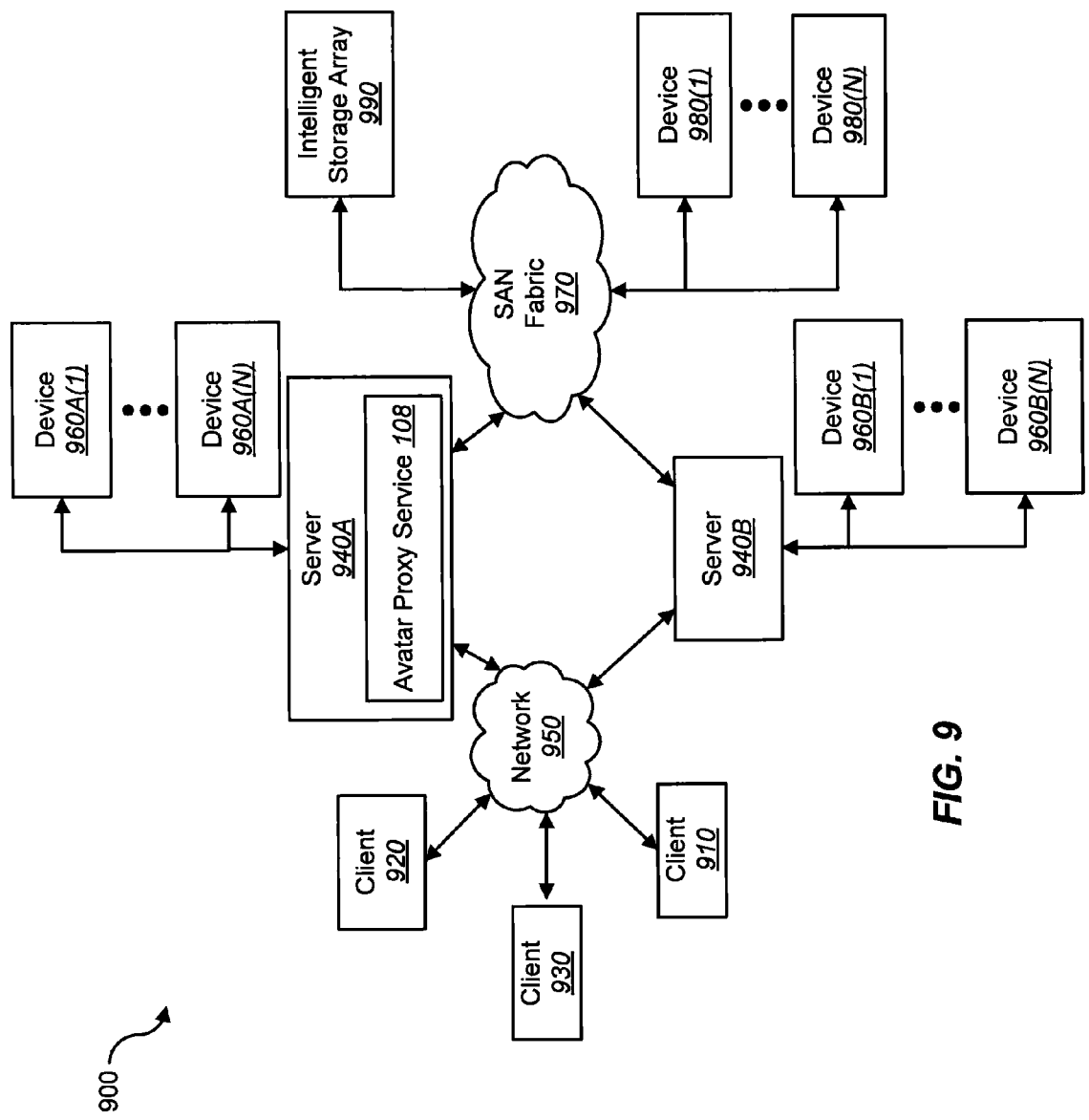
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A and 940B (any of which can be implemented using computer system 810), are coupled to a network 950. In one embodiment, the avatar proxy service 108 may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for concealing information relating to a personal profile provided by a social networking service, comprising:
    monitoring, by a social network proxy service, a message sent from the personal profile to a second profile provided by the social networking service;
    determining, by the social network proxy service, whether the second profile is a commercial profile provided by the social networking service;
    receiving the message, at the social network proxy service, when the second profile is a commercial profile; and
    using a substitute profile to publish the message to a page of the social networking service associated with the second profile on behalf of the personal profile.

2. The method of claim 1, further comprising intercepting, by the social network proxy service, a message sent from the second profile to the personal profile when the second profile is a commercial profile.

3. The method of claim 2, further comprising analyzing, at the social network proxy service, the intercepted message with respect to at least one security filter.

4. The method of claim 3, further comprising associating the message with the substitute profile when the message passes the at least one security filter.

5. The method of claim 4, further comprising using the substitute profile to publish the message to the personal profile.

6. The method of claim 4, further comprising discarding the message when the message does not pass the at least one security filter.

7. The method of claim 1, further comprising the substitute profile emulating characteristics of a profile provided by the social networking service.

8. The method of claim 1, further comprising implementing the social network proxy service in cloud storage.

9. The method of claim 4, wherein the published message includes an substitute profile identifier and a second profile identifier.

10. A computing device configured to conceal information relating to a profile provided by a social networking service, comprising:
    a processor;
    memory in electronic communication with the processor;
    instructions stored in the memory, the instructions being executable by the processor to:
        monitor a message sent from the personal profile to a second profile provided by the social networking service;
        determine whether the second profile is a commercial profile provided by the social networking service;
        receive the message when the second profile is a commercial profile; and
        use a substitute profile to publish the message to a page of the social networking service associated with the second profile on behalf of the personal profile.

11. The computing device of claim 10, wherein the instructions are executable by the processor to:

intercept a message sent from the second profile to the personal profile when the second profile is a commercial profile.

12. The computing device of claim 11, wherein the instructions are executable by the processor to:
analyze the intercepted message with respect to at least one security filter.

13. The computing device of claim 12, wherein the instructions are executable by the processor to:
associate the message with the substitute profile when the message passes the at least one security filter.

14. The computing device of claim 13, wherein the instructions are executable by the processor to:
use the substitute profile to publish the message to the personal profile.

15. The computing device of claim 13, wherein the instructions are executable by the processor to:
discard the message when the message does not pass the at least one security filter.

16. The computing device of claim 10, wherein the substitute profile of the social network proxy service is configured to emulate characteristics of a profile provided by the social networking service.

17. The computing device of claim 10, wherein the instructions are executable by the processor to:
implement a social network proxy service in cloud storage.

18. The computing device of claim 13, wherein the published message includes a substitute profile identifier and a second profile identifier.

19. A computer-program product for concealing information relating to a personal profile provided by a social networking service, the computer-program product comprising a non-transitory computer-readable medium having instructions thereon, the instructions being executable by a processor to:
monitor a message sent from the personal profile to a second profile provided by the social networking service;
determine whether the second profile is a commercial profile provided by the social networking service;
receive the message when the second profile is a commercial profile; and
use a substitute profile to publish the message to a page of the social networking service associated with the second profile on behalf of the personal profile.

20. The computer-program product of claim 19, wherein the instructions are executable by the processor to
intercept a message sent from the second profile to the personal profile when the second profile is a commercial profile.

* * * * *